United States Patent
Renaud

(10) Patent No.: US 9,810,802 B2
(45) Date of Patent: Nov. 7, 2017

(54) METHOD FOR MANAGING THE TARGET LOCATION OF A VESSEL

(71) Applicant: Sercel, Carquefou (FR)

(72) Inventor: Didier Renaud, Nantes (FR)

(73) Assignee: Sercel, Carquefou (FR)

( * ) Notice: Subject to any disclaimer, the term of this patent is extended or adjusted under 35 U.S.C. 154(b) by 0 days.

(21) Appl. No.: 14/681,803

(22) Filed: Apr. 8, 2015

(65) Prior Publication Data

US 2016/0299245 A1    Oct. 13, 2016

(51) Int. Cl.
*G01V 1/00* (2006.01)
*G01V 1/38* (2006.01)

(52) U.S. Cl.
CPC .................... *G01V 1/3808* (2013.01)

(58) Field of Classification Search
None
See application file for complete search history.

(56) References Cited

U.S. PATENT DOCUMENTS

| 8,175,765 | B2 |  | 5/2012 | Holo et al. |  |
|---|---|---|---|---|---|
| 8,473,175 | B2 | * | 6/2013 | Holo | G01V 1/3826 367/16 |
| 2005/0219948 | A1 | * | 10/2005 | Naess | G01V 1/006 367/20 |
| 2007/0064526 | A1 | * | 3/2007 | Holo | G01V 1/3826 367/15 |
| 2008/0175097 | A1 | * | 7/2008 | Storteig | B63B 21/66 367/16 |
| 2009/0141587 | A1 | * | 6/2009 | Welker | G01V 1/3817 367/16 |
| 2013/0286776 | A1 | * | 10/2013 | Renaud | G01V 1/223 367/23 |

* cited by examiner

*Primary Examiner* — James M McPherson
(74) *Attorney, Agent, or Firm* — Ipsilon USA, LLP

(57) ABSTRACT

A method for managing a target location of at least a first vessel in a seismic survey involving at least one vessel, the first vessel performing a series of shoots according to a predefined set of shot points, called preplot. The method includes, during at least a part of the survey, computing an updated position of the center of the target location for the first vessel, using the trend, as a function of time, of a curve representing a time prediction shift for a shot point, for the first vessel, and depending on at least one parameter related to the capabilities of a vessel involved in the seismic survey.

6 Claims, 7 Drawing Sheets

*Trend of a curve of time prediction shift*      *capabilities*

17

Compute updated center position of target location

METHOD FOR MANAGING THE TARGET LOCATION OF A VESSEL

1. FIELD OF THE DISCLOSURE

The field of the disclosure is that of marine seismic prospection, enabling to study the different layers of the earth crust.

In particular, the disclosure relates to a method for managing a target location of a vessel during a marine seismic acquisition involving several vessels.

The disclosure can be applied notably to the oil prospecting industry (hydrocarbon exploration) using seismic method (sea oil survey), but can be of interest for any other field which requires a system performing geophysics data acquisition in a marine environment.

2. TECHNOLOGICAL BACKGROUND

To perform a marine seismic acquisition in a survey area, it is common to use seismic sources (like "air guns", "vibratory sources", . . . ) and seismic sensors. The sensors are housed in cables, called streamers (or acoustic linear antennas or seismic cables). Several streamers are used together to form an array of thousands of sensors. Sources are towed by one or several vessels, and streamers are towed by one or several vessels. A same vessel can tow both sources and streamers (i.e. can tow one or several streamers and one or several seismic sources).

To collect the geophysical data in the marine environment, the seismic sources are activated to generate single pulses or continuous sweep of energy. The signals generated by each source travels through the different layers of the earth crust and the reflected signals are captured by the sensors (hydrophones) housed in the streamers. By processing the signals captured by the hydrophones, geophysicists are able to achieve an imaging of the different layers of the earth crust.

A seismic source should shoot at a shot point (also referred to as "shot point"), defined by its geographical coordinates (latitude/longitude and/or easting northing). When the vessel reaches this shot point, the seismic source is activated and produces an explosion. The set of shot points of all seismic sources is called "preplot".

The marine seismic acquisition is controlled and monitored by a navigation system (also referred to as INS, for "Integrated Navigation System"), which is onboard each vessel. Each INS of a vessel allows computing position of sensors and seismic sources and driving the vessel along its acquisition path, according to a predetermined preplot, and to activate seismic sources to perform seismic acquisition at desired shot points of the preplot.

The navigation system also determines the moment of firing a source for each shot point, according to the positions of the various system components. This moment of firing is referred to as "shot time".

To further increase the quality of seismic imaging, the seismic surveys can be performed in a well-known "multi-vessel" survey performed by a plurality of vessels.

In a multi-vessel survey, it is common to select a specific vessel among the plurality of vessels and to refer it to as a "master vessel". This master vessel is a reference vessel and the reference of time of each other vessels thanks to its INS. Each other vessel is referred to as "slave vessel" and is synchronized on the reference of time of the master vessel. Such "reference/master vessel" is thus the reference to compute proper position to other vessels.

So that the shooting order is complied, the various vessels must be synchronized. The shooting order of the sources is defined by the preplot and must be performed as close as possible to the geographic coordinates of the shot points specified in the preplot.

More precisely, a seismic source of a vessel should perform its shot at a target location called "Bull's Eye" (also noted "BE"), this target location being computed during the survey from the reference vessel's positions. Each vessel, or more precisely the seismic source, has to match as possible this target location at the right time. In practice, a point of the reference vessel (or of any equipment associated with the reference vessel, e.g. a source) is used as reference point to calculate the ideal position of other vessels, i.e. for space synchronization of the vessels.

In the following description, it is assumed to describe a multi-vessel survey with one master vessel which is the reference vessel and at least one other vessels of the fleet, also referred to as "slave vessels".

In such a configuration, a Bull's Eye of a slave vessel represents the ideal position where said slave vessel (or seismic source of a slave vessel) should be to perform its shot, said Bull's Eye being defined by a circular target having:
  a center, called Bull's Eye Position, which depends on the projection of the master vessel's reference point on a sail line of the slave vessel, a sail line being the way to follow by a vessel to perform its preplot. In the particular case where the slave vessels are supposed to be aligned with the master vessel, the center of the "Bull's Eye" is coincident with the projection of the master vessel's reference point on the sail line of the slave vessel. In the particular case where the slave vessels are not supposed to be aligned, there is a predetermined offset, along the sail line of the slave vessels, between the center of the slave vessel's "Bull's Eye" and the projection of the master vessel's reference point on the sail line of the slave vessels; and
  a radius of tolerance which can be determined by contract requirements (e.g. 10 m).

A reference point of the slave vessel (i.e. a seismic source) defined in advance, must be located in the "Bull's Eye" to ensure proper synchronization of said slave vessel.

A master vessel "Time to shot" (or "Shot Time T0" or "shooting time" or "master's vessel predictions") is usually computed from:
  master path and its shot points locations,
  a distance between a shot point of the preplot and a master shot predict point location (master shot predict point is usually the air guns (sources) but can also be any other point owned by the master vessel),
  master vessel speed along the path.

Usually, the "time to shot" for slave vessels is computed from a master vessel shooting time to ensure good shot scheduling. In other way, slave vessels can compute their own time to shot based on the master's vessel predictions.

To have a proper coverage, during a multi-vessel operation, each vessel has to be properly aligned to shot and record data, at the best location as possible. For that, it is necessary to control the vessels speed.

Usually, the master vessel computes speed order depending of its own sensors, and a slave vessel computes its speed relative from master's speed and master's position.

Thus, in a multi vessel configuration, there is a strong link with the reference vessel. This is a main disadvantage of this configuration. Indeed, if radio links are broken, slave vessels have no more the relative position of the master vessel. If the reference vessel has any issue and presents errors in its shots, the relative position of slave vessels will be "wrong" as they are based on a "wrong" master vessel's position. Moreover, if the master vessel has any issue and has to stop the line, slave vessels have to stop production even if they are able to continue.

Moreover, most of the other known systems are restrictive, as they work with relative positions. Indeed, in that case, all vessels must have the same kind of path (symmetric path, parallel path or the same path with an offset).

3. SUMMARY OF THE DISCLOSURE

A particular embodiment of the disclosure proposes a method for managing a target location of at least a first vessel in a seismic survey involving at least one vessel, said first vessel performing a series of shoots according to a predefined set of shot points, called preplot, wherein said method comprises, during at least a part of said survey, computing an updated position of the center of the target location for said first vessel, using the trend, as a function of time, of a curve representing a time prediction shift for a shot point, for the first vessel, and depending on at least one parameter related to the capabilities of a vessel involved in said seismic survey.

Thus, this particular embodiment relies on a wholly novel and inventive approach of the target location control of a vessel, in a multi-vessel survey or in a single vessel survey, ensuring that the vessel will shot at the proper time and the proper position without using relative speed and offset between vessels of the survey and without the need of a master vessel.

Indeed, this particular embodiment of the disclosure uses a time prediction shift to compute an updated position of the center of a target location of a first vessel, thus allowing to compute an updated target location for the first vessel, the time prediction shift used being computing using some local parameters of the first vessel as well as parameters from other vessels involved in the survey. Thus taking into account the first vessel capacities and the behavior of other vessels optimizes the target location management of the first vessel.

For example, the updated position of the center of a target location, for a first vessel, is computed using the trend of the time prediction shift, previously computed and using some physical constraints limiting the vessel, as for example a maximum and a minimum speed, a maximum and a minimum acceleration. Then, knowing this updated position of the center of the target location, an updated target location can be computed, for this vessel.

Thus, the disclosure allows taking account of short term and long term shot errors, by taking into account the evolutions of the survey (by using this trend of the curve allows) while also taking into account some of the physical constraints limiting the vessel, thus allowing to avoid "overreatings".

The time prediction shift corresponds to the difference between a time to shot corrected by using some parameters from the vessel itself and/or other vessels, and a predicted time to shot, i.e. a time to shot computed from the first vessel parameters.

It is to be noted that this method, according to its different embodiments, is applied on a plurality, or all, the vessels in the survey, in order to ensure that all vessels will shot at the proper time and at the proper position.

According to a particular feature, the seismic survey involves at least two vessels and the capabilities are related to at least one other vessel involved in the seismic survey, the other vessel being distinct from the first vessel.

According to a particular feature, computing an updated center position of a target location uses:

a current time prediction shift, the current speed Sc of the first vessel the current position of the first vessel.

According to this particular embodiment, the estimated current time prediction shift, noted c', multiplied by the current speed Sc will give the BeDA (for "Bull's eye Distance Along" that corresponds to the distance between the center of the bull's eye for the first vessel and the reference point of the first vessel, projected on the path (sail line) of the first vessel) and will match the error in position of the source of the first vessel, while taking into account the acceleration and speed capabilities of the first vessel, and predictive evolution of the time prediction shift.

Thus, the updated position of target location corresponds to the vessel position (or its source position) moved along the navigated path from the offset equal to (c'*Sc).

The disclosure also concerns a computer program product comprising program code instructions for implementing the above-mentioned method, when said program is executed on a computer or a processor.

The disclosure also concerns a non-transitory computer-readable carrier medium storing a program which, when executed by a computer or a processor, causes the computer or the processor to carry out the above-mentioned method.

In another embodiment, the disclosure also concerns a seismic system comprising at least one first vessel involved in a seismic survey and performing a series of shoots according to a predefined set of shot points, called preplot, said system comprising the following means for managing a target location of said first vessel, which are integrated in said first vessel of the vessel and activated during at least a part of said survey:

means for computing an updated position of the center of the target location for said vessel, using the trend, as a function of time, of a curve representing a time prediction shift for a shot point, for the first vessel, and depending on at least one parameter related to the capabilities of at least one vessel involved in said seismic survey.

The disclosure also concerns a system comprising means for managing the target location of the plurality of vessels involved in the survey.

Advantageously, the multi-vessel seismic system comprises means for implementing the steps of the above-mentioned method, in any of its different embodiments.

4. LIST OF FIGURES

Other features and advantages of embodiments of the disclosure shall appear from the following description, given by way of indicative and non-exhaustive examples and from the appended drawings, of which:

5. DETAILED DESCRIPTION

The disclosure relates to a method for managing the target location (thanks to the computing of an updated center position of a target location) of a first vessel, in a seismic survey involving a plurality of vessels, in order to ensure a proper coverage, during an operation involving those vessels, i.e. ensure that all vessels will shot at the proper time, at the proper position, without a strong link with a master vessel. This allows a totally adaptive survey.

In the following description, the embodiments are described in relation with a multi-vessel survey which comprises a reference vessel called "master vessel" and other vessels called "slave vessels", each synchronization of each slave vessel depending on the master vessel's synchronization.

Figure 1A:
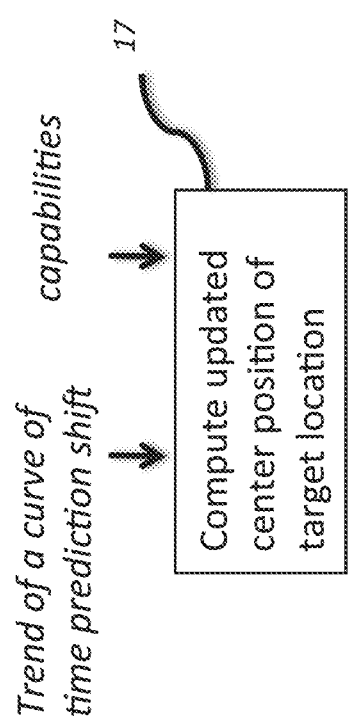
FIGS. 1a and 1b illustrate respectively a particular embodiment of the target location management method according to the disclosure.

However, the case of a multi-vessel survey is not restrictive and the disclosure can be applied to a single vessel survey, which involves only one vessel. Referring now to FIG. 1a, we present a particular embodiment of the proposed target location management method, for a first vessel involved in a survey comprising a plurality of vessels.

According to this embodiment, the method comprises computing, in step 17, an updated position of the center of the target location of a first vessel, using the trend, as a function of time, of a curve representing a time prediction shift for a shot point and some parameters related to physical capabilities of the first vessel.

This time prediction shift may be computed using any parameters that provides for a difference between two time predictions, taking account of local parameters for the first vessel, as well as parameters related to other vessels. Moreover, the updated position of the center of the target location takes account of a trend of a curve representing this time prediction shift, thus allowing matching the error in position of the vessel while taking into account the acceleration and speed capabilities of the vessel, and predictive evolution of the prediction shift.

Figure 1B:
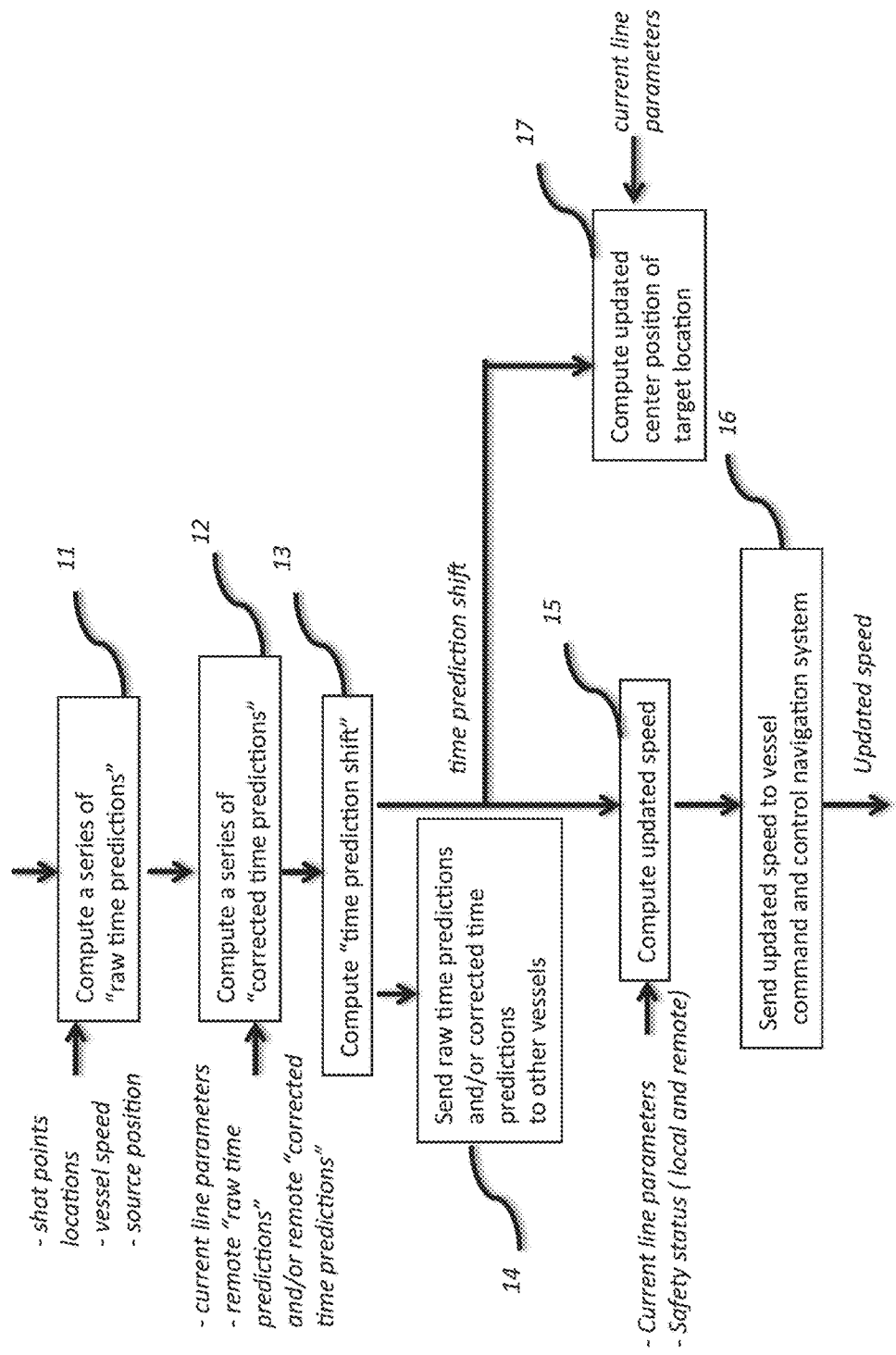

Referring now to FIG. 1b, we present this particular embodiment of the proposed target location management method, wherein the time prediction shift is computed from a series of raw time predictions and a series of corrected time predictions.

According to this embodiment, the corrected time prediction takes account of other vessel(s) parameters of the system. For example, the corrected time prediction takes account of parameters of all the other vessels involved in the survey.

It is to be noted that steps illustrated in FIG. 1b may be implemented in parallel on each vessel involved in the survey.

These steps are for example initiated by a timer loop, which typically runs continuously on each vessel during the survey. Moreover, step 14, steps 15 and 16 and step 17 may also be implemented in three parallel processes.

First of all, in step 11, a series of "raw time predictions" is computed for a first vessel of the fleet, involved in the multi-vessel survey. A "raw time prediction" can be defined as the time at which the first vessel predicts to reach a planned shot point of a preplot, and a series of raw time predictions corresponds to the raw time prediction for each assigned shot point of the first vessel. These raw time predictions are computed from the distance between the first vessel and the shot points and from the vessel speed. The source position can also be used to compute a raw time prediction.

In step 12, a series of "corrected time predictions" is computed for a first vessel. A "corrected time prediction" can be defined as the time at which the first vessel will perform the shot, even if it is not properly located on the point location of a planned shot point, as a function of internal and external parameters of the first vessel, and a series of corrected time predictions corresponds to the corrected time prediction for each assigned shot point of the first vessel. More precisely, corrected time predictions are computed using:

first vessel raw time predictions, as computed in step 11,
remote raw time predictions coming from other vessels (for example the vessels involved in a multi-vessel survey),
remote corrected time predictions coming from other vessels, (for example the vessels involved in a multi-vessel survey),
"Minimum shot cycle time interval", or "Min STI" corresponding to the minimum time that has to be respected between consecutives shots, on a same vessel, and/or between many vessels,
"Maximum shot cycle time interval", or "Max STI" corresponding to the maximum time that has to be respected between consecutives shots, on a same vessel, and/or between many vessels,
"Tolerance zone", which defines the tolerance area around the planned shot point location, where a shot is considered as valid,
"Shooting time slot", typically based on a time division algorithm. Each vessel is allowed to shoot only in predetermined time windows. As example, with two vessels aligned on UTC time, one vessel will be able to shot in time windows [00,05], [20,25], [40,45], the other one in time windows [10,15], [30,35], [50,55].
Any other parameters that are used by the shooting predictions algorithm.

Then, in step 13, a "time prediction shift" is computed, for each shot point assigned to the first vessel, using at least the series of raw time predictions and the series of corrected time predictions previously computed.

In fact, the time prediction shift corresponds to the difference between a corrected time prediction, taking account of other vessels parameters (Min STI, Max STI, Tolerance zone, etc. . . . ) and/or its own parameters in a multi-vessel survey or only taking account of its own parameters in a single survey, and a raw time prediction depending only of the first vessel. Particularly in a multi-vessel survey, this computed time prediction shift allows aligning all the involved vessels by taking account of the shot errors, without using a master vessel as a reference. Basically, according to this embodiment, if:

the time prediction shift is negative, it means that the first vessel is late;
the time prediction shift is positive, it that the first vessel is ahead;
the time prediction shift has a huge negative value, it means that the first vessel is very late; and
the time prediction shift has a huge positive value, it means that the first vessel is far ahead other vessels.

Next, in step 14, the raw time predictions, computed in step 11, and the corrected time predictions, computed in step 12, are sent to other vessels (for example all or a part of all vessels involved in the survey), to be used as input of the same process that is running in parallel on other vessels.

In step 15, which may be implemented in parallel of step 14, the updated speed is computed, for the first vessel, using the time prediction shift delivered by step 13. Indeed, on the contrary to most of the known solutions (where the slave's vessel speed is computed from the reference vessel predictions), the updated speed is not computed here from a relative offset from the position of the master vessel, but from the trend of the time prediction shift.

Moreover, this way of controlling, which is independent from a master vessel, allows avoiding non-needed corrections, or wrong corrections, of the vessel speed based on wrong data in case of errors on the master shots.

The method of the disclosure also allows controlling the vessels speed from corrected distances, as the relation between time and distance is known.

Figure 2A:
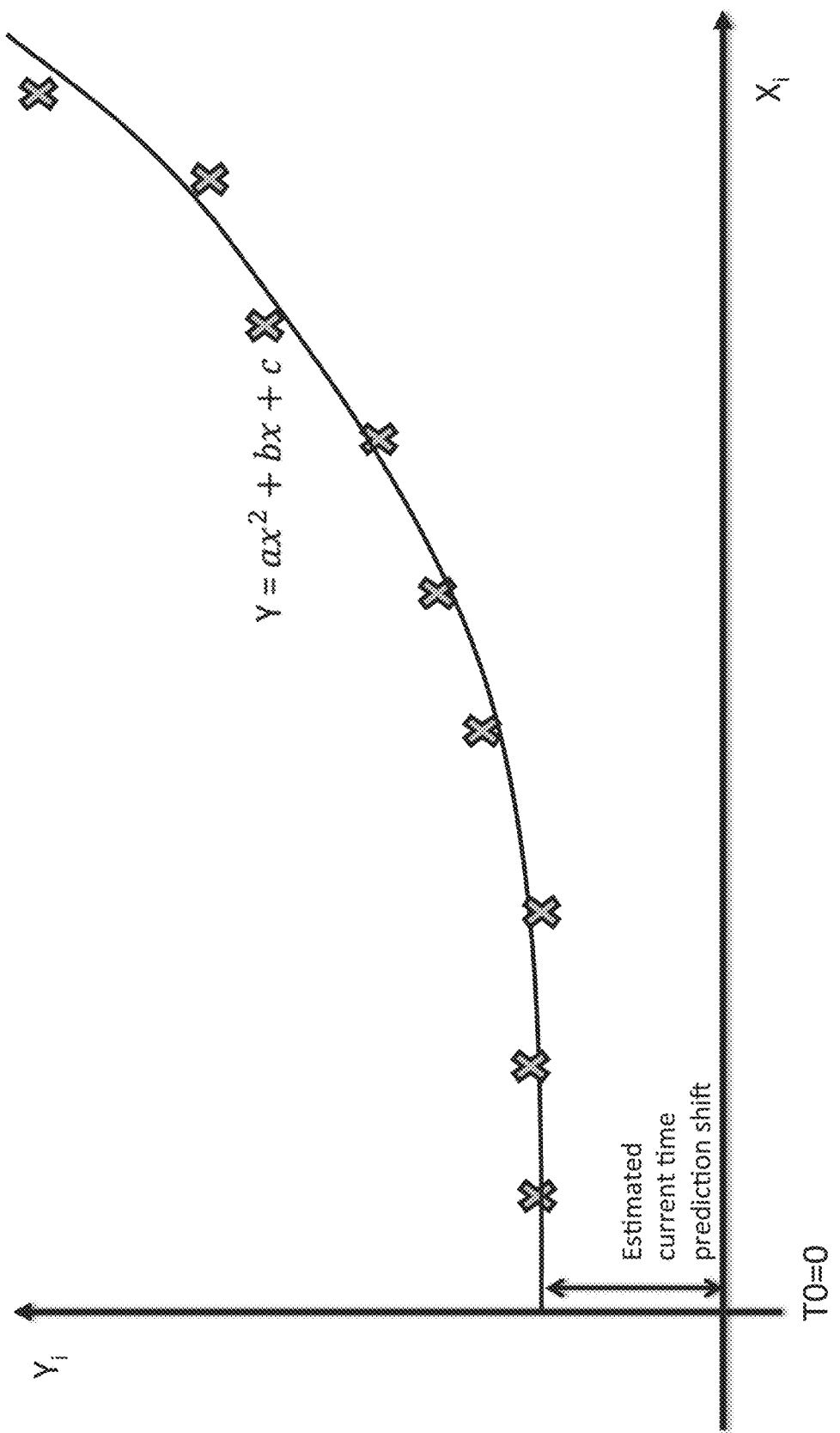
FIG. 2a represents a curve associated to time prediction shift, along the time

FIG. 2a illustrates a time prediction shift, called Yi, of a first vessel at a predictive time corresponding to the raw time prediction, called time Xi. In that case, the estimated time shift Yi is computed from a time prediction shift trend curve. This time prediction shift trend curve is built from time shifts at given Xi (for a given point of this curve, the time shift corresponds to the difference between the corrected time to shoot and the theoretical time to shoot defined in the preplot) and can be represented by the following equation:

$$Y = ax^2 + bx + c,$$

where the parameters $\{a, b, c\}$ can be (for example) resolved from a least square resolution algorithm based on the series of values $\{x, y\}$.

These parameters are usually used in the definition of second-degree polynomial corresponding to the interpolated curve, the aim being to obtain the trend curve from a linear regression, knowing the time shifts from the knowledge of constraints like the "Minimum shot cycle time interval", the "Maximum shot cycle time interval", the "Tolerance zone", as described here above. For example, the parameters $\{a, b, c\}$ are correlated with the following features: fixed difference, speed, and acceleration. "a" is expressed in 1/seconds, "b" has no dimension and "c" is expressed in seconds.

However, a vessel is limited by physical constraints, and the trend curve (in full line) illustrated in FIG. 2a and represented by the above equation $Y = ax^2 + bx + c$ doesn't fit the capabilities of the vessel.

Figure 2B:
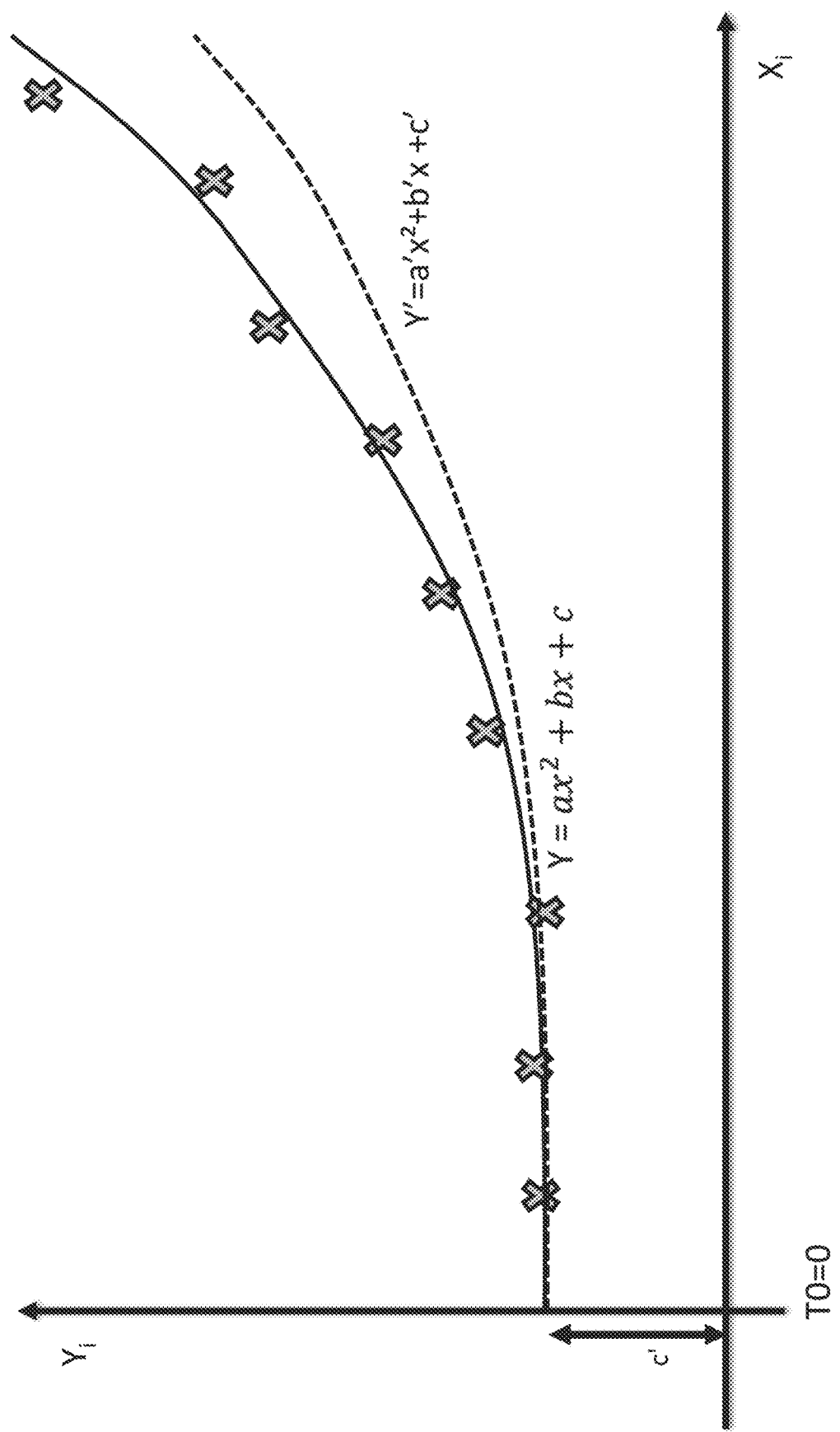
FIGS. 2b and 2c represent a curve associated to time prediction shift taking account of some parameters related to first vessel, according to an embodiment of the disclosure.

FIG. 2b illustrates these capabilities of the vessel, and the time prediction shift trend curve that takes into account the physical limits of the vessel can be represented by the following equation:

$$Y' = a'x^2 + b'x + c',$$

where the parameters a' and b' are limited by the current speed Sc, the maximum and minimum speed values $\{S_{min}, S_{max}\}$ and the maximum and minimum acceleration values $\{A_{min}, A_{max}\}$.

For example, Sc is the current speed of the current vessel, at the time of computation and $[0, X_{max}]$ is the time range of the raw time predictions series (from 0 to the last raw time predictions computed for the first vessel).

As $(y+x)*Sc$ corresponds to the distance to shot, the relations between the different parameters a', b', a, b, $S_{min}$, $S_{max}$, $A_{min}$, $A_{max}$, Sc and $X_{max}$ are defined by:

$A_{min}/(2*Sc) < a' < A_{max}/(2*Sc)$, and
$(S_{min}/Sc) - 2*a'x - 1 < b' < (S_{max}/Sc) - 2*a'x - 1$ So typically, a' will be equal to:
a if $A_{min}/(2*Sc) < a < A_{max}/(2*Sc)$,
$A_{min}/(2*Sc)$ if $a < A_{min}/(2*Sc)$,
$A_{max}/(2*Sc)$ if $a > A_{max}/(2*Sc)$.

Moreover, b' will be equal to:

b if $\min(((S_{min}/Sc) - (2*a'*S_{max} - 1)), ((S_{min}/Sc) - 1)) < b < \max(((S_{max}/Sc) - (2*a'*S_{max} - 1)), ((S_{max}/Sc) - 1))$,
$\min(((S_{min}/SC) - (2*a'*S_{max} - 1)), ((S_{min}/Sc) - 1))$ if $b < \min(((S_{min}/Sc) - (2*a'*S_{max} - 1)), ((S_{min}/Sc) - 1))$,
$\max(((S_{max}/Sc) - (2*a'*S_{max} - 1)), ((Smax/Sc) - 1))$ if $b > \max(((Smax/Sc) - (2*a'*S_{max} - 1)), ((S_{max}/Sc) - 1))$.

c', which is the time prediction shift while taking into account the acceleration and speed capabilities of the first vessel, can be defined as: $c' = Y_a - (a'*X_a^2 + b'*X_a)$.

Then, in step 17, which may be implemented in parallel of steps 14 and 15, an updated position of the center of the target location, i.e. an updated center position for the "Bull's Eye", is computed, for the first vessel, using the time prediction shift delivered by step 13.

Indeed, said updated center position for the target location can be computed from the "Bull's eye Distance Along", also called BeDA, corresponding to the distance between the center of the target location (also called "bull's eye position") for the first vessel and the reference point of the first vessel, projected on the path (sail line) of the first vessel. Thus, the BeDA can be written as BeDA=c'*Sc.

If we only consider the full line curve, on FIG. 2b (corresponding to the curve of FIG. 2a), which represents a time prediction shift trend curve, then c'=c=Y0 (Y at time T0=0). Thus, the BeDA (=c'*Sc) will only takes account of short term shot errors, without any "idea" of the long term position of the first vessel.

Then, if we consider the time prediction shift trend curve Y' (in dotted line) that takes into account the physical limits of the vessel, we can see that the vessel cannot follow the trend, and that Y' differs from Y. Thus, c' differs from c, and c' needs to be computed, as following.

Figure 2C:
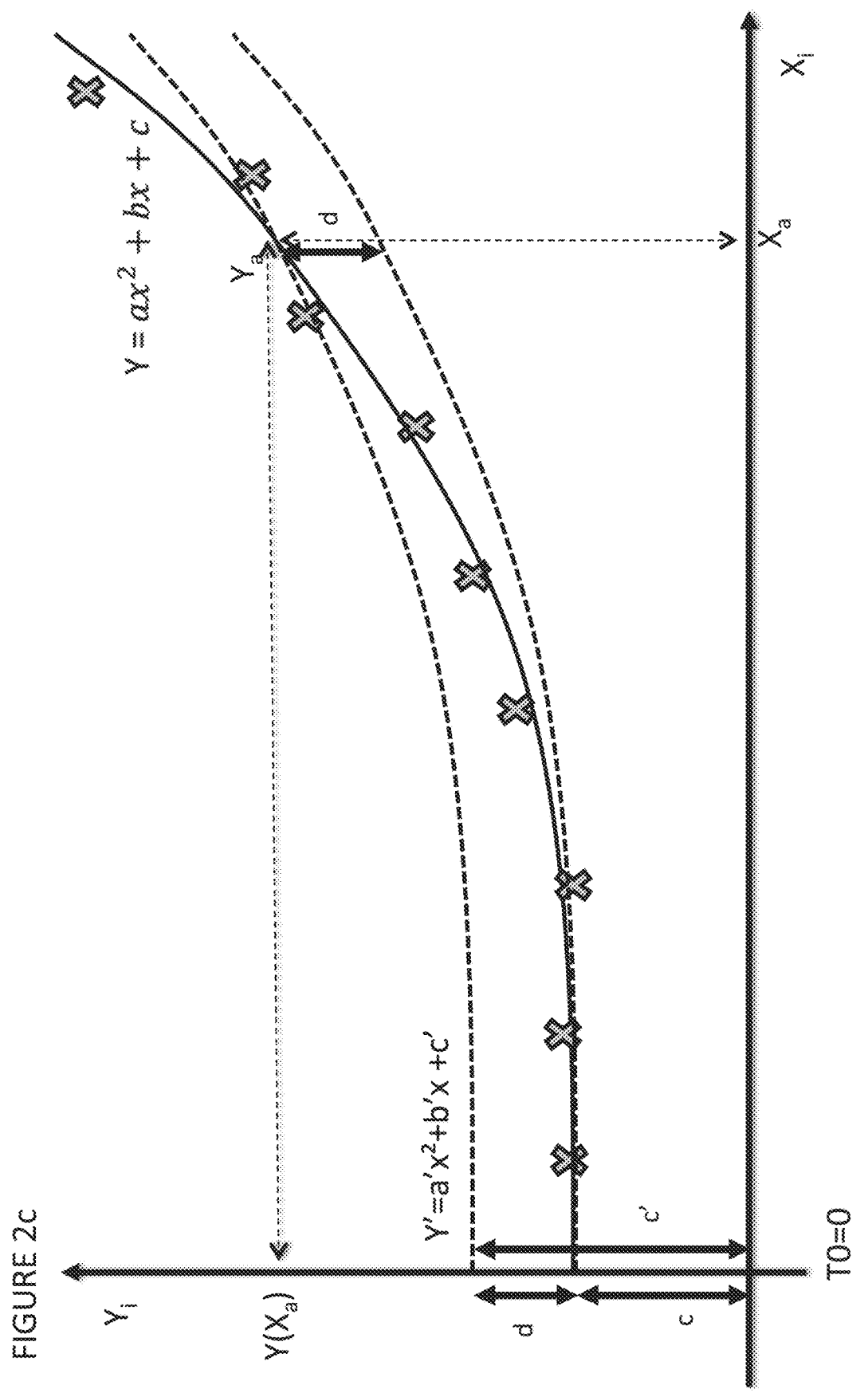

Let's then consider an expected "reaction time", noted $X_a$, allowing predicting the evolutions of the survey, and thus taking into account long term shot errors. In that case, c' can be written as $c' = Y(X_a)$, and the BeDA (=c'*Sc) will lead to "overreatings" because of a too high level of prediction. This is represented on FIG. 2c, with the time prediction shift trend curves Y' (in dotted line) that takes into account the physical limits of the vessel. The difference between the curve Y and the curve Y' corresponds to d and c' can be written as c'=c+d.

Thus, a BeDA computed by taking account of the acceleration and speed capabilities of the vessel, together with the time prediction shift previously computed, for a "reaction time" Xa, also takes account of d, and with c'=c+d, BeDA=(c+d)*Sc. In that case, such a BeDa will ensure to correct an error in position of the source of the first vessel, taking account of short term and long term shot errors.

Then, knowing the BeDA and the updated center position of the target location for the first vessel, an updated target location can be computed for this first vessel, from well-known algorithms, not detailed.

Figure 3:
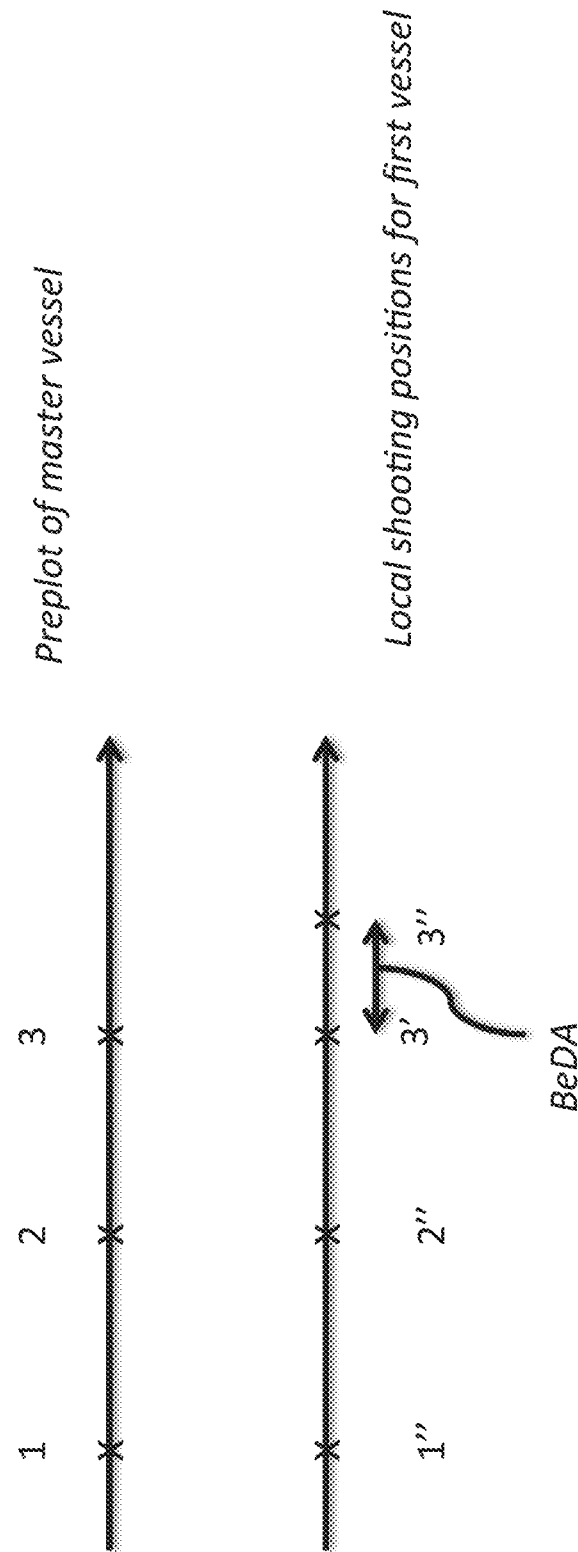
FIG. 3 represents the positions of master and a first vessel to illustrate an embodiment of the disclosure for computing an updated target location.

This is illustrated by FIG. 3, wherein the preplot (for three shots) of a master vessel is represented, with the target locations 1, 2 and 3.

The local positions of the first vessel are also illustrated, during the survey, and represented by the positions 1", 2" and 3".

Thus, knowing this BeDA from the prediction shift, as explained above, and the position 3" of the first vessel, the position of the center of the target location 3' can be computed. Knowing this Bull's Eye position 3', the Bull's Eye can then be computed, without any link to the master vessel.

Thus, according to the embodiments of the disclosure, the updated target location for a first vessel is not computed from an offset regarding a master vessel position, as in most of the state of the art solutions, but from the trend of the time prediction shift, regarding the first vessel position, as well as the updated speed.

Thus, the updated position of the center of the target location corresponds to the vessel position (or its source position) moved along the navigated path from the offset equal to (c'*Sc).

Figure 4:
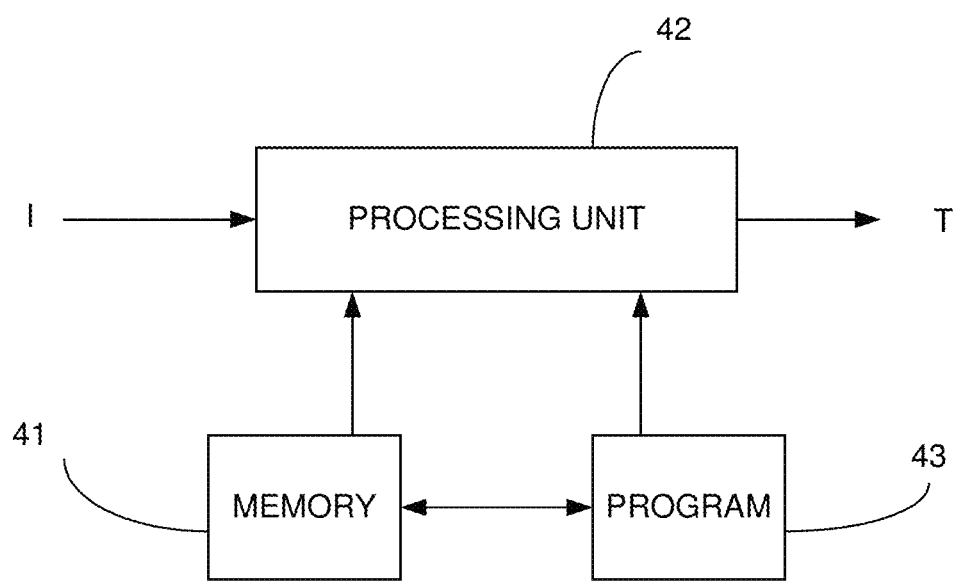
FIG. 4 illustrates a device include in an exemplary system of the disclosure.

FIG. 4 illustrates a device included in a system according to the disclosure. For example, the device comprises a memory 41 constituted by a buffer memory, a processing unit 42 equipped for example with a microprocessor, and driven by the computer program 43 implementing the acts of a method for managing a target location of at least a first vessel in a seismic survey involving at least one vessel as described herein. At initialization, the code instructions of the computer program 43 are for example loaded into a memory and then executed by the processor of the processing unit 42. The processing unit 42 inputs for example a trend of the curve as a function of time and at least one parameter related to the capabilities of a vessel in the seismic survey. The microprocessor of the processing unit 42 implements the acts of the method according to the instructions of the computer program 43 to compute an updated position of a center of the target location for the first vessel. This device comprises part or all of means described for implementing the proposed method. The device thus comprises for example the following means for managing a target location of at least a first vessel in a seismic survey involving at least one vessel, said first vessel performing a series of shoots according to a predefined set of shot points, called preplot:

means for managing the target location of said first vessel, which are integrated in said first vessel and activated during at least a part of said survey, which include:

means for computing an updated position of the center of the target location for said first vessel, using the trend, as a function of time, of a curve representing a time prediction shift for a shot point, for the first vessel, and depending on the at least one parameter related to the capabilities of a vessel involved in said seismic survey The disclosure, in at least one embodiment, is aimed especially at overcoming the above-described different drawbacks of the prior art.

More specifically, at least one embodiment of the disclosure provides a method and a system for ensuring that all vessels will shot at the proper time, at the proper position for example in a multi-vessel survey, without a strong link with a reference vessel.

At least one embodiment of the disclosure provides a method and a system of this kind, which minimizes the exploration time on a survey/operation, thus minimizing fuel consumption.

At least one embodiment of the disclosure provides a method and a system of this kind, which respects customer specific requirement as mammal regulation such as maximum shot cycle time/maximum shot cycle time by vessel), minimum shot cycle time, simultaneous shooting, and predefined time delay between some shots (these last terms are more detailed later on the description).

At least one embodiment of the disclosure provides a method and a system of this kind, which enables a predictive behavior, a tolerance to irregular preplots.

At least one embodiment of the disclosure provides a method and a system of this kind, which provides for a reliable multi-vessel survey, able to work with poor quality radio links.

At least one embodiment of the disclosure provides a method and a system of this kind that is simple to implement and inexpensive.

Although the present disclosure has been described with reference to one or more examples, workers skilled in the art will recognize that changes may be made in form and detail without departing from the scope of the disclosure and/or the appended claims.

What is claimed is:

1. A method for managing a target location of at least a first vessel in a seismic survey involving at least one vessel, comprising:
   the first vessel performing a series of shots according to a predefined set of shot points, called a preplot,
   during at least a part of the seismic survey, computing an updated position of a center of the target location for the first vessel, using a trend, as a function of time, of a curve representing a time prediction shift for a shot point of the set, for the first vessel, and depending on at least one parameter related to capabilities of a vessel involved in the seismic survey, said time prediction shift being computed as the difference between a corrected time prediction that corresponds to a time at which the first vessel will perform the shot and a time prediction corresponding to a time at which the first vessel predicts to reach a planned shot point of said preplot; and
   navigating the first vessel based on the updated position.

2. The method for managing the target location of a vessel according to claim 1, wherein computing the updated position of the center of the target location uses:
   a current time prediction shift,
   a current speed Sc of the first vessel, and
   a current position of the first vessel.

3. The method for managing the target location of a vessel according to claim 1, wherein the seismic survey involves at least two vessels and the capabilities are related to at least one other vessel involved in the seismic survey, the at least one other vessel being distinct from the first vessel.

4. A non-transitory computer-readable carrier medium storing a computer program comprising program code instructions for implementing a method for managing a target location of at least a first vessel in a seismic survey involving at least one vessel, when the program is executed on a computer or a processor, the method comprising:
   the first vessel performing a series of shots according to a predefined set of shot points, called a preplot:
   during at least a part of the seismic survey, computing an updated position of a center of the target location for the first vessel, using a trend, as a function of time, of a curve representing a time prediction shift for a shot point of the set, for the first vessel, and depending on at least one parameter related to capabilities of a vessel involved in the seismic survey, said time prediction shift being computed as the difference between a corrected time prediction that corresponds to a time at which the first vessel will perform the shot and a time prediction corresponding to a time at which the first vessel predicts to reach a planned shot point of said preplot; and
   navigating the first vessel based on the updated position.

5. A seismic system comprising:
   at least one first vessel involved in a seismic survey involving at least one vessel, the first vessel performing a series of shots according to a predefined set of shot points, called a preplot;

means for managing a target location of the first vessel, which are integrated in the first vessel and activated during at least a part of the seismic survey, which include:

means for computing an updated position of the center of the target location for the first vessel, using a trend, as a function of time, of a curve representing a time prediction shift for a shot point of the set, for the first vessel, and depending on at least one parameter related to capabilities of a vessel involved in the seismic survey, said time prediction shift being computed as the difference between a corrected time prediction that corresponds to a time at which the first vessel will perform the shot and a time prediction corresponding to a time at which the first vessel predicts to reach a planned shot point of said preplot; and means for navigating the first vessel based on the updated position.

6. The seismic system according to claim 5, wherein the system comprises:

means for managing the target location of a plurality of vessels involved in the seismic survey.

* * * * *